United States Patent
Wilkinson

(10) Patent No.: US 7,870,306 B2
(45) Date of Patent: Jan. 11, 2011

(54) SHARED MEMORY MESSAGE SWITCH AND CACHE

(75) Inventor: Keith Iain Wilkinson, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 95 days.

(21) Appl. No.: 11/469,447

(22) Filed: Aug. 31, 2006

(65) Prior Publication Data

US 2008/0126507 A1    May 29, 2008

(51) Int. Cl.
*G06F 3/00* (2006.01)

(52) U.S. Cl. .............................. 710/20; 710/22; 710/23; 710/29; 710/33; 710/36; 710/37

(58) Field of Classification Search ................... 710/20, 710/22, 23, 29, 33, 36, 37, 62, 107
See application file for complete search history.

(56) References Cited

U.S. PATENT DOCUMENTS

| | | | |
|---|---|---|---|
| 5,347,637 A | 9/1994 | Halford | |
| 6,233,243 B1 | 5/2001 | Ganmukhi et al. | |
| 6,839,347 B1* | 1/2005 | Ishida et al. | 370/389 |
| 6,854,025 B2* | 2/2005 | Knight et al. | 710/22 |
| 6,980,552 B1* | 12/2005 | Belz et al. | 370/392 |
| 6,983,303 B2 | 1/2006 | Pellegrino et al. | |
| 6,988,160 B2* | 1/2006 | Daniel et al. | 710/310 |
| 7,010,633 B2 | 3/2006 | Arndt et al. | |
| 7,093,024 B2 | 8/2006 | Craddock et al. | |
| 7,095,750 B2 | 8/2006 | Craddock et al. | |
| 7,099,955 B1 | 8/2006 | Gregg et al. | |
| 7,143,196 B2 | 11/2006 | Rimmer et al. | |
| 7,363,400 B2 | 4/2008 | Tanaka et al. | |
| 2002/0046291 A1* | 4/2002 | O'Callaghan et al. | 709/238 |
| 2002/0172195 A1 | 11/2002 | Pekkala et al. | |
| 2003/0145045 A1 | 7/2003 | Pellegrino et al. | |
| 2003/0172202 A1* | 9/2003 | Chirco et al. | 710/22 |
| 2004/0030763 A1 | 2/2004 | Manter et al. | |
| 2004/0225810 A1* | 11/2004 | Hiratsuka | 710/305 |
| 2006/0013253 A1 | 1/2006 | Hufferd | |
| 2006/0230185 A1 | 10/2006 | Errickson et al. | |
| 2007/0005908 A1* | 1/2007 | Lakshmanamurthy et al. | 711/146 |
| 2007/0143546 A1* | 6/2007 | Narad | 711/130 |

OTHER PUBLICATIONS

"U.S. Appl. No. 11/469,462, Non Final Office Action Mailed Oct. 8, 2009", 26 pgs.

* cited by examiner

*Primary Examiner*—Tariq Hafiz
*Assistant Examiner*—Jasjit S Vidwan
(74) *Attorney, Agent, or Firm*—Schwegman, Lundberg & Woessner, P.A.

(57) ABSTRACT

A method and apparatus are described to provide shared switch and cache memory. The apparatus may comprise a message switch module, a cache controller module, and shared switch and cache memory to provide shared memory to the message switch module and to the cache controller module. The cache controller module may comprise pointer memory to store a plurality of pointers, each pointer pointing to a location in the shared switch and cache memory (e.g., point to a message header partition in the shared switch and cache memory). If there is a corresponding pointer, a memory read response may be sent to the requesting agent. If there is no corresponding pointer, a write data request may be sent to a corresponding destination agent and, in response to receiving the requested data, a pointer to the stored data in the pointer memory may be provided.

20 Claims, 7 Drawing Sheets

SHARED MEMORY MESSAGE SWITCH AND CACHE

FIELD

The disclosed subject matter relates to computer systems, and in example embodiments, to a memory message switch for transferring data from one or more peripherals to one or more computers.

BACKGROUND

Conventional network hardware and software may be used to support data transfers between an originating host network node and a destination target network node over one or more designated data channels. The host network node may represent a host system/host processor/host server (host) on which a variety of applications or services are provided. The host typically connects to the network via a dedicated hardware network interface adapter, which may be referred to as a host channel adapter (HCA). The host channel adapter (HCA) may be used to provide an interface between the host network node and the switched network via high speed data links. Similarly, destination target channel adapters (TCA) may be used to provide an interface between the multi-stage switched network and an I/O controller (e.g., storage and networking devices) of either a second network or a target I/O unit via high speed data links.

Memory message switches are used to route data and messages among agents, where an agent may be a computer or peripheral. A memory message switch comprises memory, where data and messages are stored. An agent, the requesting agent, requests data from another agent, the destination agent, where the requested data is first stored in the memory message switch before it is provided to the requesting agent.

In a memory message switch, it is useful to reduce the latency between a request for data and a read of the requested data.

BRIEF DESCRIPTION OF THE DRAWINGS

Example embodiments are illustrated by way of example and not limitation in the figures of the accompanying drawings, in which like references indicate similar elements and in which.

DESCRIPTION OF EXAMPLE EMBODIMENTS

Figure 1A:
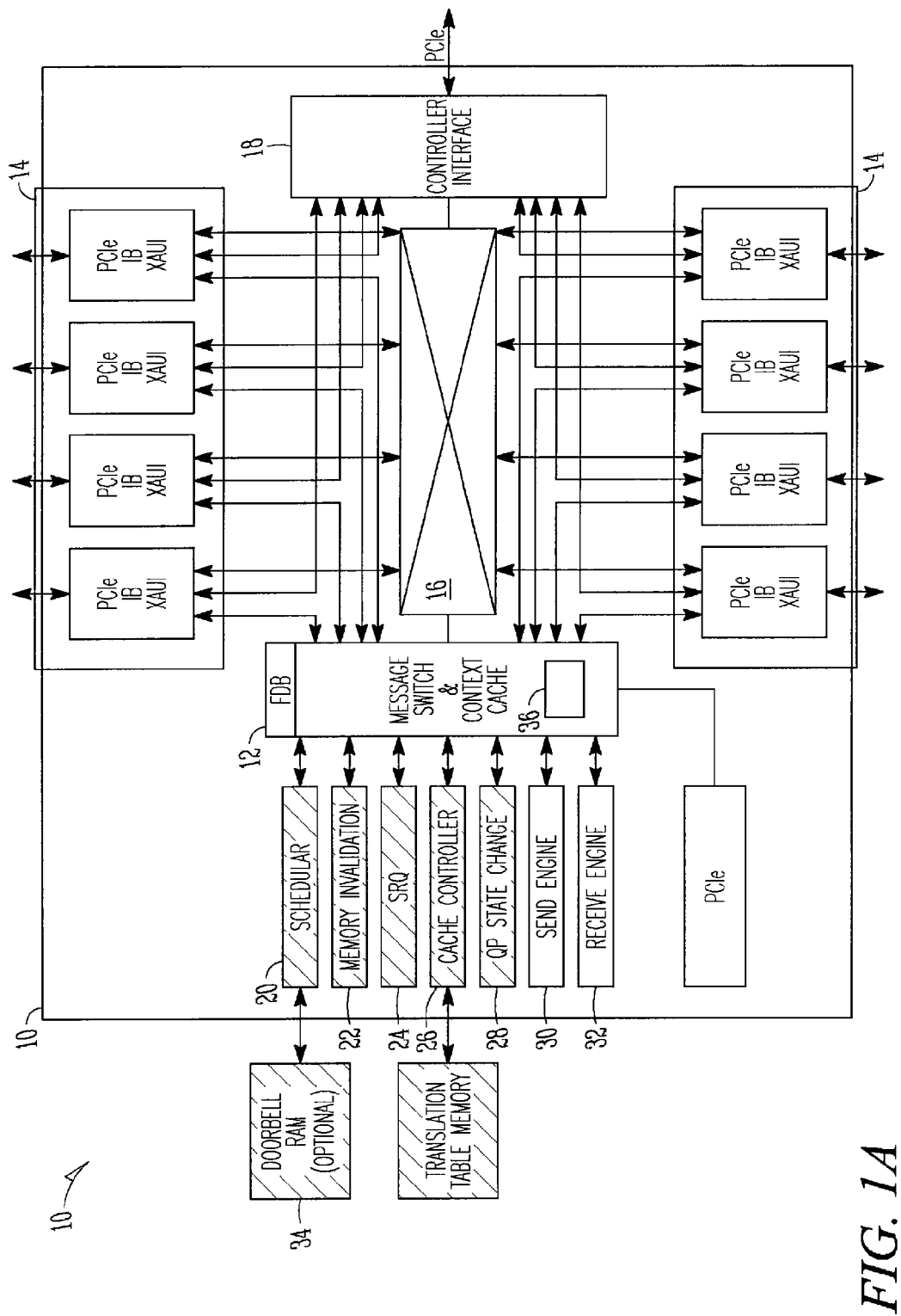
FIG. 1A illustrates an example network device including a shared memory message switch and cache module, according to an example embodiment.

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter.

As described further below, according to various example embodiments of the disclosed subject matter described herein, there is provided a Shared Memory Message Switch and Cache module (referred to herein as a switch module) for use in a network device. In an example embodiment, the switch module may be deployed in an deployed in an Infini-Band network environment and, accordingly, is described merely by way of example with reference thereto.

Example InfiniBand Network Environment

A data network in various embodiments may generally comprise a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) busses as described in the "*PCI Local Bus Specification, Revision* 2.1" set forth by the PCI Special Interest Group (SIG) on Jun. 1, 1995, may be utilized to deliver message data to and from I/O devices, namely storage subsystems and network devices via the data network. An extension of this is PCI Extended (PCI-X) and PCI Express networking technology.

Other example data network architectures include Infini-Band™ and its predecessor, Next Generation I/O (NGIO) which have been developed by to provide a standards-based I/O platform that uses a switched network and separate I/O channels instead of a shared memory-mapped bus architecture for reliable data transfers between end-nodes in a data network, as set forth in the "*Next Generation Input/Output (NGIO) Specification*," NGIO Forum on Jul. 20, 1999 and the "*InfiniBand™ Architecture Specification*," (IB network) the InfiniBand™ Trade Association on Oct. 24, 2000. Using NGIO/InfiniBand™, a host system may communicate with one or more remote systems using a Virtual Interface (VI) architecture in compliance with the "*Virtual Interface (VI) Architecture Specification, Version* 1.0". NGIO/InfiniBand™ and VI hardware and software may often be used to support data transfers between an originating host network node and a destination target network node over one or more designated channels.

The host network node may represent a host system/host processor/host server (host) on which a variety of applications or services are provided. The host connects to the network (e.g. an IB network) via a network interface adapter, which is referred to in IB parlance as a host channel adapter (HCA). The host channel adapter (HCA) may be used to provide an interface between a memory controller of the host and the switched network via high speed NGIO/InfiniBand links. Similarly, destination target channel adapters (TCA) may be used to provide an interface between the multi-stage switched network and an I/O controller (e.g., storage and networking devices) of either a second network or an I/O unit via high speed NGIO/InfiniBand links. Separately, another target channel adapter (TCA) may be used to provide an interface between a memory controller of the remote system and the switched network via high speed NGIO/InfiniBand links. Both the host channel adapter (HCA) and the target channel adapter (TCA) may be broadly considered as network adapters provided to interface either the host system or any one of the remote systems to the switched network to enable the endpoints (nodes) to communicate to each other over NGIO/InfiniBand channel(s). However, NGIO/InfiniBand is merely one example embodiment or implementation of the various embodiments described and claimed. Rather, the various embodiments may be applicable to a wide variety of any number of data networks, hosts and I/O units. For example, practice of the various embodiments may also be made with future specifications that may be published as part of the InfiniBand™ Architecture Specification as set forth by the InfiniBand Trade Association.

In an example IB network, client processes running on the host may communicate with the transport layer of the IB network by manipulating transport service instances, known as "queue pairs" (QPs), each made up of a send work queue and a receive work queue. Communications take place between a local QP maintained by the HCA and a remote QP maintained by a target channel adapter at the other side of the network. To send and receive messages over the network, the client/host initiates work requests (WRs), which cause work items, called work queue elements (WQEs), to be placed in appropriate queues within the HCA. For each work request, the client/host prepares a descriptor defining the operation to be performed by the HCA. Each WQE specifies a corresponding request, from a consumer application executed by the host ("requester"), for a corresponding prescribed operation to be performed by a destination InfiniBand network node ("responder"), for example a target. The interaction between requester and responder is specified via the QP. In general, the HCA executes WQE's on a particular work queue in the order that the WQE's were placed on the particular work queue. When the HCA completes a WQE, a completion queue element ("CQE") may be placed on a completion queue.

The various embodiments of the data network described and claimed herein include multi-stage switched network elements including a plurality of switches for allowing a host system and a remote system to communicate to a large number of other host systems and remote systems over one or more designated channels. A channel connection can be considered an abstraction that is established over the switched network to allow two QP's at source and destination endpoints (e.g., host and remote systems, and I/O units that are connected to the switched network) to communicate with each other. Each channel can support one of several different connection semantics. Physically, a channel may be bound to a hardware port of a host system. Each channel may be acknowledged or unacknowledged.

For remote direct memory access (RDMA) and send operations between a host and a target node, the work request descriptor typically contains a gather list pointing to data that are to be read out of memory and transmitted as part of the message. To execute RDMA write and send operations, the HCA reads the corresponding descriptors, fetches the data specified in the gather list from the host memory, and loads the data into packets for transmission over the network to the remote QP. Because the gather list in a single WR may specify as much as $2^{31}$ bytes (2 GB) of data to be transmitted, while the IB network does not support packets larger than 4 KB, some WQE's can require the HCA to generate a large number of packets. In an example embodiment, each QP may have its own maximum transfer unit (MTU), or maximum packet size, which may be, for example, 256, 512, 1024, 2048 or 4096 bytes. Unlike TCP/IP, however, in which there is no fixed relation between message boundaries and packet boundaries, the IB transport layer protocol specifies that each WR and WQE corresponds to a single message. The boundaries of the first and last packet for a given WQE thus correspond to the boundaries of the message. The size of the first and subsequent packets, except for the last packet, is equal to the MTU. The last packet takes up the remainder of the message, of length less than or equal to the MTU.

In generating an outgoing message or servicing an incoming message on any given QP, the HCA uses context information pertaining to the QP. The QP context is created in a memory accessible to the HCA by the host process that sets up the QP. The host configures the QP context with fixed information such as the destination address, negotiated operating limits, service level and keys for access control. Typically, a variable part of the context, such as the current packet sequence number (PSN) and information regarding the WQE being serviced by the QP, is subsequently updated by the HCA as it sends and receives messages. For example, to service an incoming packet on a reliable connection, the HCA may read the packet transport header, which identify the target QP, and uses the context of that QP to verify that the packet came from the correct source and that the PSN is valid (no missed packets). Based on this information, the HCA may generate the appropriate acknowledgment (ACK or NACK) or other response. As another example, to generate a RDMA write request on a reliable connection, the HCA reads the WQE and retrieves necessary data from the QP context, such as the destination address, target QP and next PSN. It then accesses the host memory to fetch the required data, and sends the packet to the destination.

As mentioned above, although the description above is described in relation to the IB transport layer protocol, the various embodiments described herein support multiple different transport protocols.

An example embodiment of a virtual HCA engine 10, in accordance with an example embodiment, is illustrated in FIG. 1A. The virtual HCA engine 10 is shown to a shared memory message switch module 12 in accordance with an example embodiment. Further, the HCA engine 10 is shown to include a set of input/output ports 14, which provide a set of data channels for data communications between a and a host node and a target node. In the example embodiment illustrated in FIG. 1A, eight such data channels are provided. As such, the embodiment illustrated in FIG. 1A can support up to 64 virtual HCA's. It will be apparent to one of ordinary skill in the art that a different number of data channels in a particular embodiment may be used. In an example embodiment, each of the input/output ports 14 can be used to transfer data using a variety of hardware interfaces and data transfer protocols (e.g. PCI-e, IB, XAUI, etc.). Each of the ports 14 are coupled to a data switch 16, which is used under control of message switch module 12 to interconnect any two ports of ports 14 for the transfer of a message data payload between a sender and a receiver coupled to the interconnected ports. In this manner, virtual the HCA engine 10 can be used to transfer message data payloads between a plurality of senders and a plurality of receivers. Each of ports 14 are also shown to be connected to a controller interface 18. The controller interface 18 may be used as a management interface to monitor and configure the HCA engine 10.

As illustrated in FIG. 1A, the HCA engine 10 includes a set of onboard dedicated processing components to support a plurality of virtual HCA's. These processing components include, by way of example, a scheduler 20, a memory invalidation engine 22, a shared receive queue (SRQ) 24, a cache controller module 26, a QP state change controller 28, a send engine 30, and a receive engine 32.

The scheduler 20 may handle the sequencing of processing operations performed by the HCA engine 10. To send and receive messages over the network, the client/host may initiates work requests (WRs), which cause work items, called work queue elements (WQEs), to be placed in memory accessible to the HCA engine 10. For each work request, the client/host may prepare a descriptor defining the operation to be performed by one of the virtual HCA's supported by the HCA engine 10. The WQE or ancillary data can specify the identity of the virtual HCA associated with the particular WQE. Each WQE may specify a corresponding request, from a consumer application executed by the host ("requester"), for a corresponding prescribed operation to be performed by a destination network node ("responder"), for example a target. Client processes running on the host may communicate with the transport layer of the network by manipulating transport service instances, QP's, each made up of a send work queue and a receive work queue. Communications may take place between a local QP maintained by the HCA engine 10 and a remote QP maintained by a target channel adapter at the other side of the network. The interaction between requester and responder may be specified via the QP. In an example embodiment, once the client/host has prepared the WR defining the network operation to be performed, the client/host may signal the new WR to the HCA engine 10 using a doorbell (e.g. an interrupt) signal. For example, the client/host can write to a register in PCI space to signal the HCA engine 10. In an example embodiment, these doorbell signals may be provided to the scheduler 20 via a doorbell memory 34. The doorbell memory 34 may provide a first-in-first-out (FIFO) buffer for retaining incoming doorbell signals that may be received in rapid succession. In general, the HCA engine 10 may execute WQE's in the order that the WQE's were signaled to the HCA engine 10. In an example embodiment, dual schedulers within scheduler 20 can be implemented to handle send side and response side scheduling. In addition, scheduler 20 can include a plurality of queues to retain incoming QP's in a plurality of quality-of-service (QoS) levels, the highest priority QP's being handled first by scheduler 20.

The send engine 30 may processes send work queues of a QP. This processing may involve the generation of data packets for retaining the content of a message to be sent and managing the sending of the data packets out of the appropriate one of ports 14 to the target node (destination node) of the message. The send engine 30 may also generate the necessary packet headers and retrieve the data payload to be sent from a designated memory area as defined by the send work queue. The send engine 30 may also handle the receipt of an acknowledgement from the target node upon the successful transfer of each data packet or the processing necessary after a data packet transfer time-out. In an example embodiment, the send engine 30 may handle multiple concurrent contexts corresponding to multiple concurrent active virtual HCA's. Because the processing performed by the send engine 30 is message-based, each active context is valid until the transfer of the associated message is complete.

The receive engine 32 may process receive work queues of a QP. This processing may involve the procurement of a local memory (e.g., cache provided in the message switch module 12) for the received data and managing the receipt of the data packets via one of ports 14 from the source node (source) of the received message. The receive engine 32 may also handle the retrieval of the data payload from each received data packet and transferring the data payload to a designated memory area as defined by the receive work queue. The receive engine 32 may also handle the generation and sending of an acknowledgement to the source node upon the successful receipt of each data packet. Further, in an example embodiment, the receive engine 32 handles multiple concurrent contexts corresponding to multiple concurrent active virtual HCA's. Because the processing performed by the receive engine 32 is message-based, each active context is valid until the receipt of the associated message is complete.

The QP state change controller 28 may be a central controller for managing and sequencing all QP state changes requested by the host or by any of the processing components of the HCA engine 10. Because there may be multiple concurrent contexts active in the HCA engine 10 at any one time, it may be beneficial to coordinate QP state changes through a central controller (e.g., the QP state change controller 28). In various example embodiments, QP states can include, for example: ready to receive, ready to transmit, various error states, a migrating state, etc. A QP state change may be initiated by a HCA or by the host.

The shared receive queue (SRQ) 24 may manage and serialize the sharing of message data input buffers among multiple WQE's and contexts. The shared receive queue (SRQ) 24 may handle shared receive queues across multiple contexts in the HCA engine 10. In this manner, the shared receive queue (SRQ) 24 may prevent conflicts in the allocation and use of shared receive queues across multiple contexts.

The memory invalidation engine 22 may be a central controller for managing and sequencing all memory read requests and memory invalidation requests as requested by the host driver or by any of the processing components of the HCA engine 10. Because there may be multiple concurrent contexts active in the HCA engine 10 at any one time, it may be beneficial to coordinate memory read requests and memory invalidation requests through a central controller (e.g., the memory invalidation engine 22). In an example embodiment, the memory invalidation engine 22 may interact with the send engine 30 and the receive engine 32 for memory read requests. In addition, the memory invalidation engine 22 may also interact with the host driver, send work queues, and target nodes via "Send with Invalidate" messages for memory invalidation requests.

The cache controller module 26 may be a central controller for managing and sequencing all cache memory access as requested by any of the processing components of the HCA engine 10. In an example embodiment, the memory message switch and context cache are shared. Because there may be multiple concurrent contexts active in the HCA engine 10 at any one time, it may be beneficial to coordinate cache memory access through a central controller (e.g., the cache controller module 26). In an example embodiment, the cache controller module 26 may coordinate access to shared switch and cache memory 36 integrated within the message switch 12. In an example InfiniBand environment, HCA context information may be stored in the shared switch and cache memory 36. In this manner, context information is readily available to any of the processing components of the HCA engine 10, access to which may be controlled by the cache controller module 26.

The message switch module 12 may be a central controller for managing and sequencing all shared memory access as requested by any of the processing components of the HCA engine 10. Because there may be multiple concurrent contexts active in the HCA engine 10 at any one time, it may be beneficial to coordinate shared memory access through a central controller (e.g., the shared message switch and context cache 12). In an example embodiment, the message switch module 12 and the cache controller module 26 may coordinate access to shared switch and cache memory 36 in message switch module 12. Data corresponding to memory requests that miss the cache can be retrieved from shared memory and retained in the cache for subsequent use by other processing components in virtual HCA engine 10. In an example embodiment, messages processed by the message switch module 12 can be partitioned into a header portion and a data payload portion (as described by way of example with reference to FIG. 1B below). The header portion (see message header 62 in FIG. 1B) of such messages can be processed and/or updated by the message switch module 12 as the message is processed for transmission to a target node or received from a target node. The data payload portion (see message payload 64 in FIG. 1B) of the message can be directly routed via the data switch 16 to one of the ports 14 for transmission to the target node or received via the data switch 16 through one of the ports 14 from the target node. The corresponding message header may be used by the message switch module 12 to control the data switch 16 to direct the associated data payload portion of the message to the appropriate destination. In an example embodiment, messages processed by the message switch module 12 can include a header portion without a corresponding data payload portion. In this case, the message switch module 12 can route the message (without data payload) directly to/from a target node via ports 14.

Example Apparatus Including Shared Switch and Cache Memory

Figure 1B:
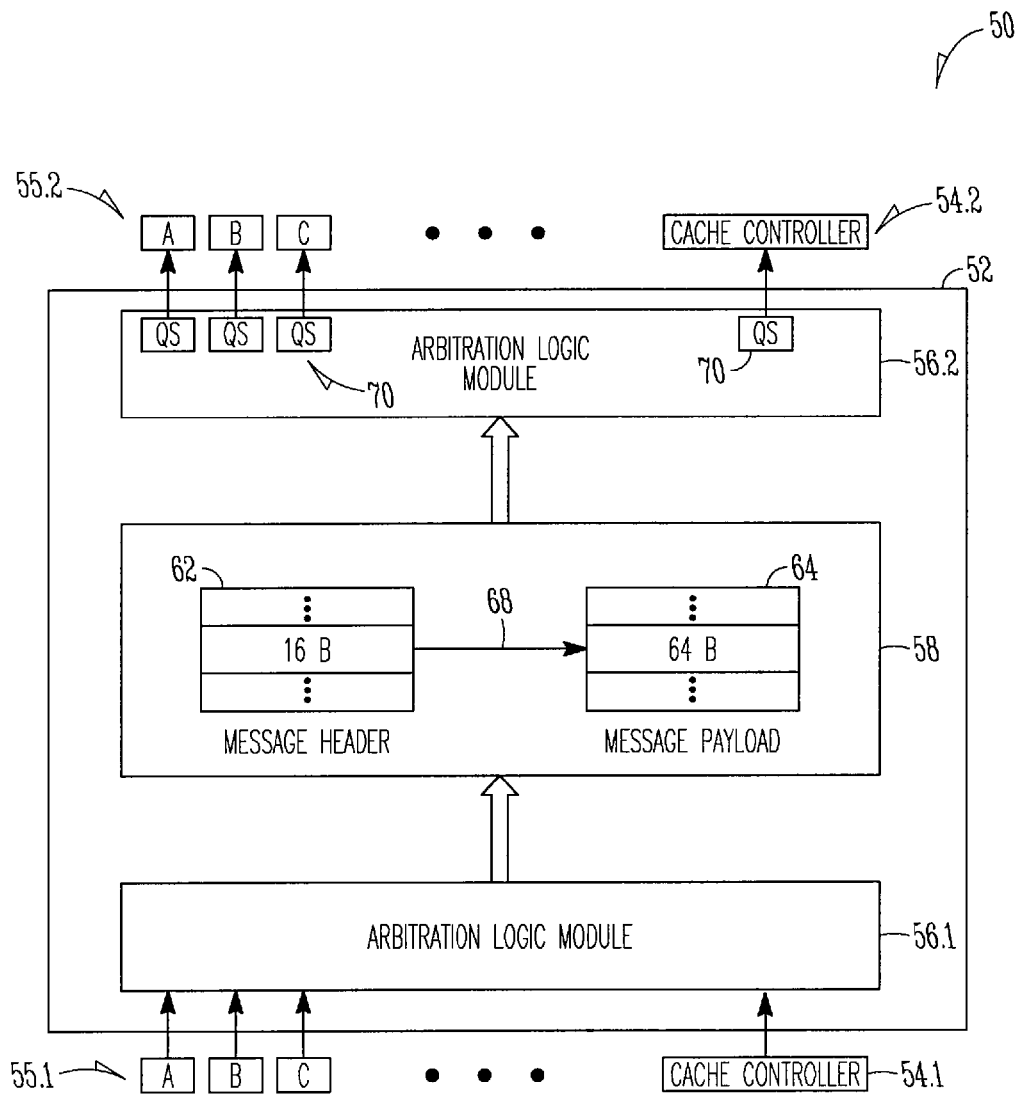
FIG. 1B illustrates an high-level functional abstraction of an example shared memory message switch and cache module of the network device of FIG. 1A.

FIG. 1B illustrates a high-level functional abstraction of apparatus 50, in accordance with an example embodiment, to provide a message switch module 52 and a cache controller module 54. The message switch module 52 and cache controller module 54 are shown to include shared memory switch and cache memory 58. In the example embodiment, the shared switch and cache memory 58 is shown to be integrated within the message switch module 52. The apparatus 50 may be deployed in the HCA engine 10 and, accordingly, may resemble and perform the functionality of the message switch module 12 and the cache controller module 26.

In an example embodiment, the cache controller module 54 is shown to be connected as an agent to the message switch module 52. Various agents 55.1, 55.2 may communicate messages to each other through the message switch module 52. The agents 55.1 and 55.2 may be provided at various nodes in a network and, when the apparatus 50 is deployed in the HCA engine 10, the nodes may communicate with the HCA engine 10 via the ports 14 (see FIG. 1A). The message switch module 52 is shown to comprise an arbitration logic module 56 (illustrated as two modules 56.1 and 56.2 for ease of explanation) and the shared switch and cache memory 58 (which may correspond to the shared switch and cache memory 36 in FIG. 1A). The arbitration logic module 56 may queue request from the agents 55.1, 55.2, and handle other associated logic and interfacing. It is to be understood that, for purposes of the example embodiments, a module may be a functional unit, and may comprise one or more discrete components.

In an example embodiment, the shared switch and cache memory 58 shown in the message switch module 52 may be dual ported memory. As mentioned above, the arbitration logic module 56.2 is physically the same as arbitration logic module 56, and the agents 55.1 and 55.2 connected to arbitration logic modules 56.1 and 56.2 may be physically the same agents. It is pedagogically useful, however, to abstract the arbitration logic module 56 into separate modules 56.1 and 56.2 as indicated by way of example in FIG. 1B, where the arbitration logic module 56.1 queues messages from the agents 55 to the message switch module 52, and arbitration logic module 56.2 provides messages from the message switch module 52 to the agents 55.2. The agents 55.1 may be considered as being connected to the arbitration logic module 56.1 as the requesting agents (e.g., provided at a requesting node), and the agents 55.2 may be considered as being connected to the arbitration logic module 56.2 as the destination agents (e.g., at a destination node). An agent 55 may be provided at any host computer device (e.g., a server blade), or other I/O (input/output) device or peripheral, or the like.

Figure 2:
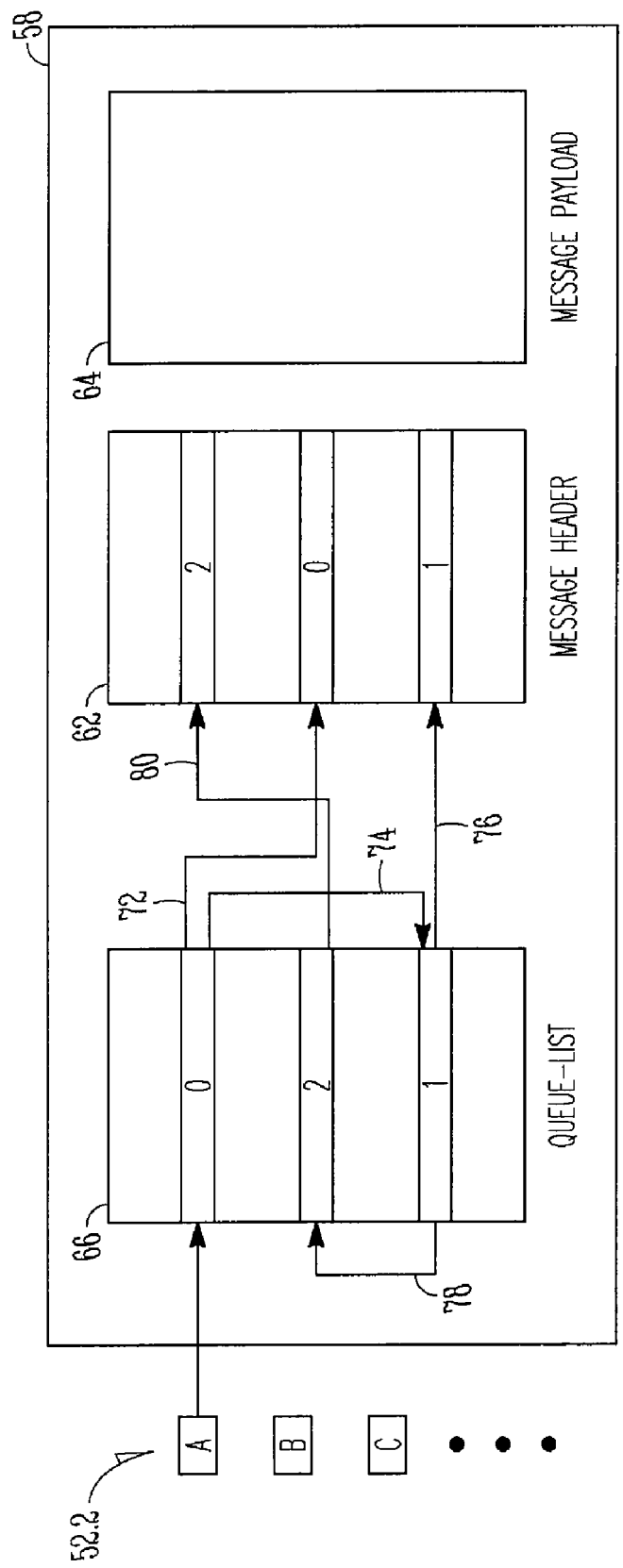
FIG. 2 illustrates an example queue-list for an agent communicating with the network device.

The shared switch and cache memory 58 is shown by way of example to be logically partitioned into two partitions; a "Message Header" 62 and a "Message Payload" 64 are provided. It will be appreciated that the shared switch and cache memory 58 may have other partitions to maintain various queues (e.g., a Queue-List 66 as shown in FIG. 2). The Message Header 62 may store header information for message packets, and the Message Payload 64 may store payload data associated with message packets. A message may be a short message, comprising only a message header, or a message may be a long message, comprising both a message header and a data payload part. The Message Header 62 may for example comprise information denoting a destination agent, a source agent, an OPCODE (operation code), such as READ or WRITE, or the like.

For a long message, an entry in Message Header 62 providing its message header may also contain a pointer (see arrow 68) to a corresponding entry in the Message Payload 64 providing the associated payload data. In the example embodiment of FIG. 1B, entries in the Message Header 62 may be 16 Bytes wide, and payload data entries in the Message Payload 64 may be 64 Bytes wide. An entry in the Message Payload 64 may also include a pointer to another entry in the Message Payload 64 if the payload data requires more than one entry for storage.

Each destination agent 55.2 may have a queue-list of messages to read, where a queue-list may be empty or not empty. This binary state of a corresponding queue-list is indicated by "QS" 70 in the arbitration logic module 56.2, and each QS 70 of a corresponding agent 55.2 may be stored in a register associated with that agent. A Queue-List 66 is shown at a high level of abstraction in FIG. 2. The Queue-List 66 may be a logical partition of the shared switch and cache memory 58.

Referring in more detail to FIG. 2, each destination agent 55.2 may or may not have a pointer to an entry in the Queue-List 66, depending upon whether its queue state is not-empty or empty. An entry in the Queue-List 66 has a pointer to an entry in Message Header 62. If there is more than one message in the Queue-List 66 of a destination agent 55.2, then a linked list may be stored in the Queue-List 66, where each entry in the linked list points to a corresponding entry in the Message Header 62. In the example of FIG. 2, entry 0 in the Queue-List 66 has a pointer 72 to entry 0 in the Message Header 62, and also a pointer 74 to entry 1 in the Queue-List 66. Entry 1 in the Queue-List 66 has a pointer 76 to entry 1 in the Message Header 62, and also a pointer 78 to entry 2 in the Queue-List 66. Entry 2 in the Queue-List 66 has a pointer 80 to entry 2 in the Message Header 62. Accordingly, for the particular example shown in FIG. 2, destination agent A has a queue state that is not-empty, and has three messages.

In the example embodiment shown in FIG. 1B, the cache controller module 54 is shown as an agent 55.2 connected to arbitration logic module 56.2. As is the case with the arbitration logic 56.1, 56.2 and agents 55.1, 55.2, the cache controller module 54 is also shown as two example components 54.1, 54.2 to facilitate explanation. However, it will be noted that the cache controller module 54 may be a single physical component. The cache controller module 54 may control the shared switch and cache memory 58. If a requesting agent 55.1 desires cacheable data, it may send its request to the cache controller module 54.1, and not to the destination agent 55.2. The cache controller module 54 may determine whether the requested data is cached or not. The cache controller module 54 may use the Message Header 62 and the Message Payload 64 in the shared switch and cache memory 58 for its cache memory. Thus, in an example embodiment, the shared switch and cache memory 58 is shared by the message switch module 52 and the cache controller module 54. A single integrated memory switch and cache memory 58 may thus be provided, instead of separate switch memory and cache memory. It should be noted that the shared switch and cache memory 58 may be provided anywhere in a network device and need not be located within the message switch module 52 (as shown in FIG. 1B). For example shared switch and cache memory may be located in the cache controller module 54; the issue being that the memory, wherever it is located, is shared between the cache controller module 54 and the message switch module 52.

In an example embodiment, by sharing data in the shared switch and cache memory 58, rather than in separate memory (e.g., separate memory in the cache controller module 54) there may be less traffic through the message switch module 52. For example, if a cache controller had its own separate cache memory, then a request to the cache controller for data stored in the cache controller would involve the cache controller writing the requested data to a memory switch module, and having the requested data sent to the requesting agent by way of the memory message switch. However, by keeping cached data in the shared switch and cache memory 58, if the data requested by the requesting agent 55.2 has already been cached in the shared switch and cache memory 58, then it is immediately available to send to the requesting agent 55.1 by way of the message switch module 52. Accordingly, latency is expected to be reduced than for the case in which the message switch module 52 and the cache controller module 54 share memory.

Figure 3:
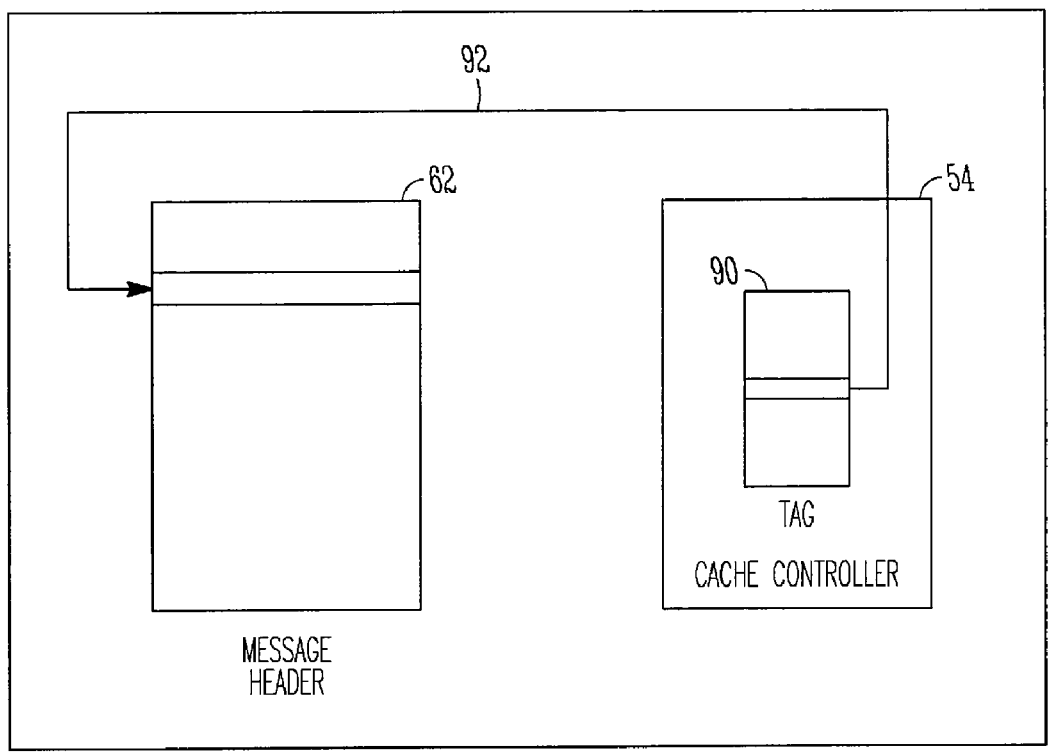
FIG. 3 illustrates an example cache controller module of the example network device.

The example operation of the cache controller module 54 is shown at a high level of abstraction in FIG. 3, and is shown to comprise pointer memory referred to, by way of example, as "TAG" memory 90. When a requesting agent 55.1 sends a message to the cache controller module 54 for cacheable data at a particular address, a portion of that address is used as an index into the TAG memory 90. If there is an entry in the TAG memory 90 that matches the index in the address provided by the requesting agent 55.1, then the requested data already exists in the shared switch and cache memory 58. The entry in the TAG memory 90 may have a pointer 92 to an entry in the Message Header 62, as indicated in FIG. 3. The message header information in the entry in the Message Header 62 may then be made available to the requesting agent 55.1. If, however, there is no entry in the TAG memory 90 that matches the index in the address, then the cache controller module 54 may send a message to the destination agent 55.2 that has the requested data. In response to the message, the destination agent 55.2 may write the requested data to the shared switch and cache memory 58, and the cache controller module 54 may update its TAG memory 90 to indicate that the requested data is now cached in the shared switch and cache module 54. The cache controller module 54 may then send a message to the requesting agent 55.1, with identifying an address (e.g., via a pointer) of the requested data in the shared switch and cache memory 52. These operations are shown by way of example in methods 100 and 110 of FIG. 4 and FIG. 5.

Figure 4:
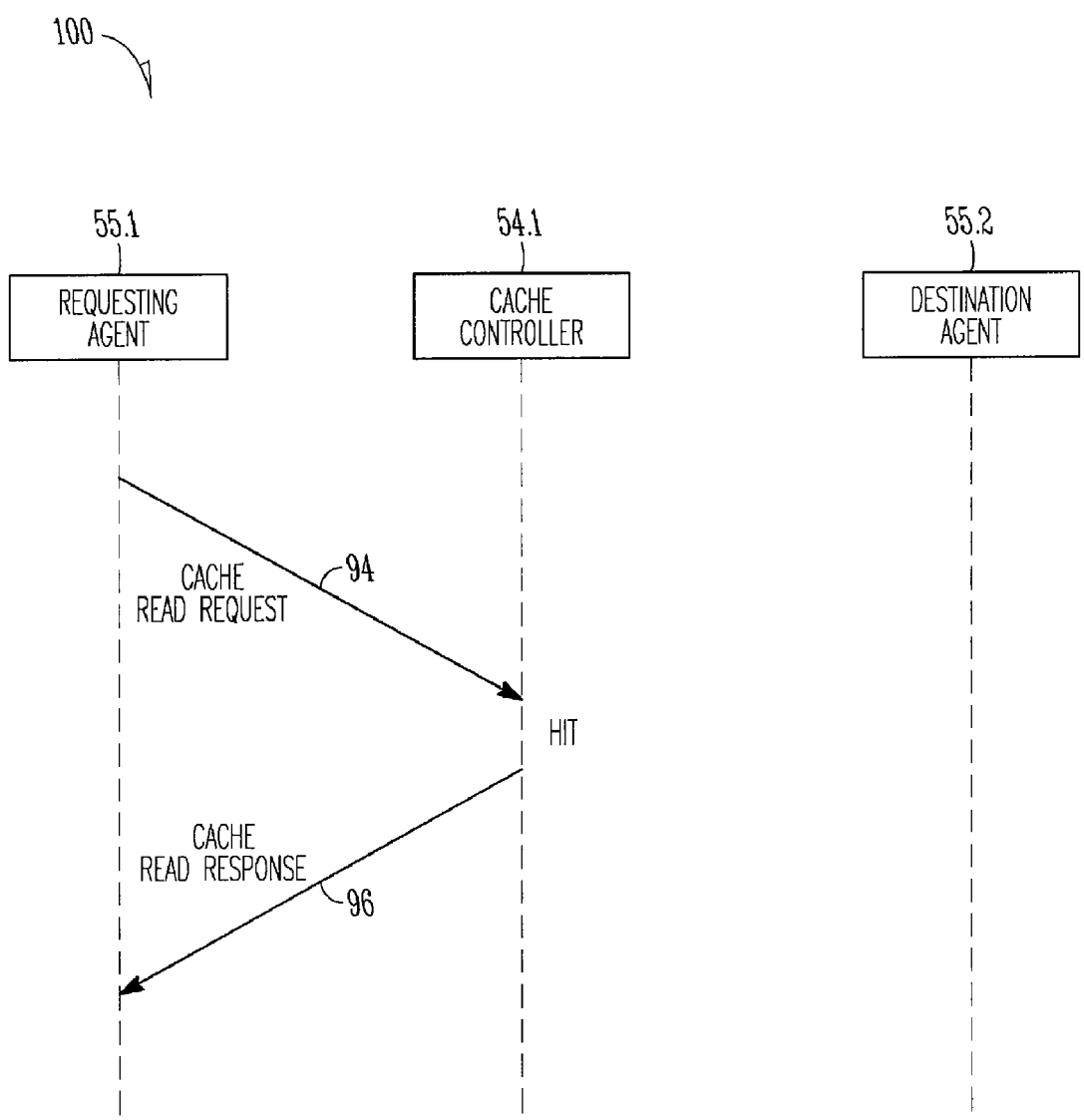
FIG. 4 illustrates an interaction diagram of a method, according to an example embodiment, of providing a shared memory message switch and cache.

FIG. 4 illustrates the case in which there is a cache hit. Referring to FIG. 4, a requesting agent (e.g., one of the agents 55.1 shown in FIG. 1B) may send a cache READ request 94 to a cache controller (e.g., the cache controller module 54 shown in FIG. 1B). A cache READ request 92 may be a short message, sent through a memory message switch (e.g., the memory switch module 52 of FIG. 1B), to the cache controller. Header information in the cache READ request 94 may include an address for a destination agent (e.g., one of the agents 55.2 in FIG. 1B). If a portion of this address matches an entry in the TAG memory 90 (see FIG. 3), then there is a cache hit. In the example of FIG. 4, there is shown to be a cache hit, and the cache controller module 54.1 may then send a cache READ response 96 to the requesting agent 55.1. A cache READ response 96 may be a short message, with its header comprising an address identifier (e.g., a pointer) to the requested data, which is known to be stored in the shared switch and cache memory 58. Accordingly, the requesting agent 55.1 may be able to retrieve the requested data directly from the message switch module 52 without any message being sent to or from the destination agent 55.2 (or the cache controller module 54).

Figure 5:
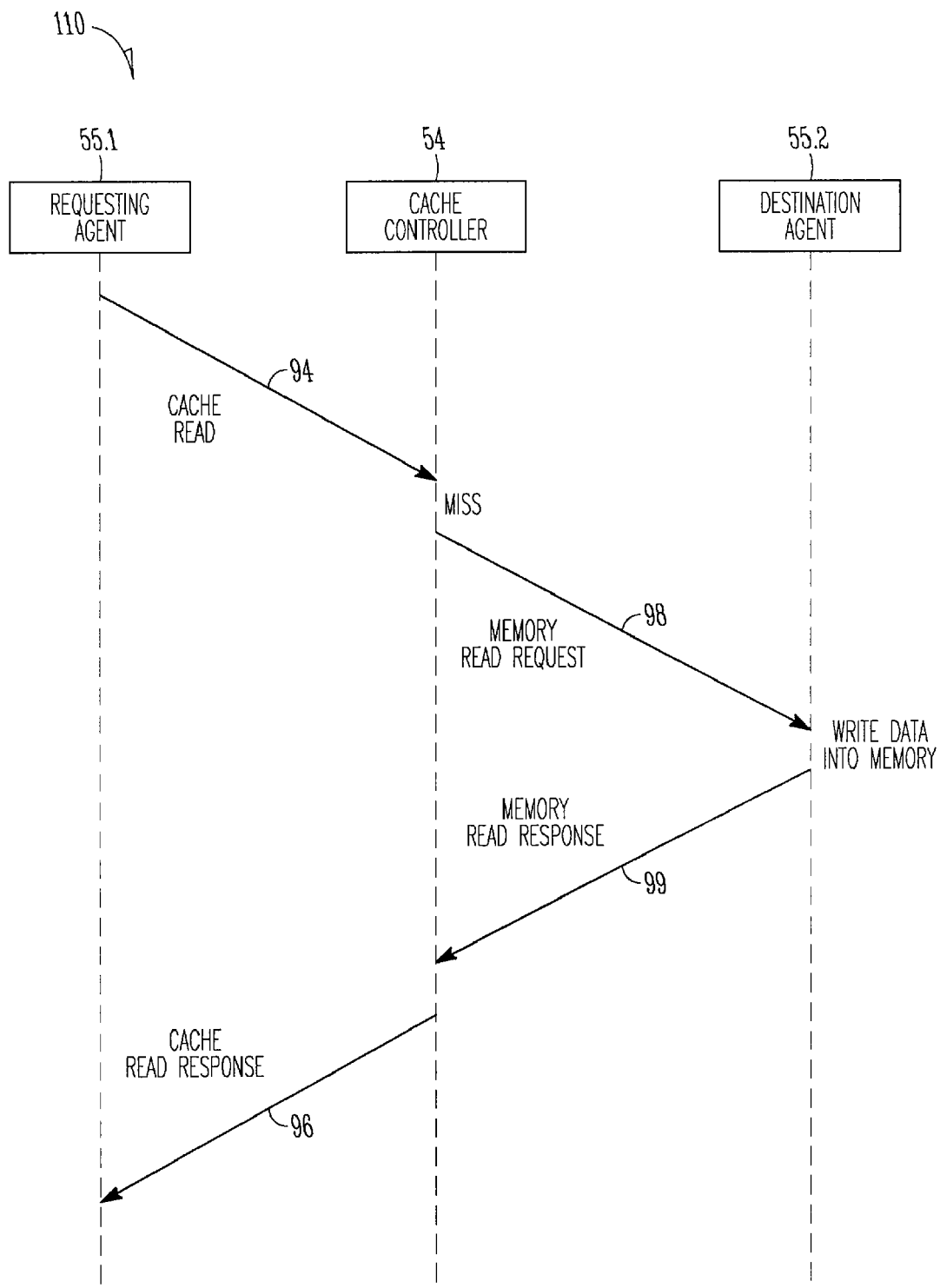
FIG. 5 illustrates an interaction diagram of a method, according to an example embodiment, of providing a shared memory message switch and cache.

FIG. 5 illustrates the case in which there is shown to be a cache miss. Referring to FIG. 5, the requesting agent 55.1 may send a cache READ request 94 to the cache controller module 54. Because it is assumed that there is a cache miss, there is no entry in the TAG memory 90 that matches the index partition of the address in the header of the cache READ request 94, and as a result, the cache controller module 54 sends a memory READ request 98 to the destination agent 55.2. The memory READ request 98 may be a short message, requesting that the destination agent 55.2 write the requested data to the message switch module 52. When the destination agent 55.2 has written the requested data to the message switch module 52, it may send a memory READ response 99 to the cache controller module 54. The memory READ response 99 may be a short message whose header contains a pointer to the desired entry in the Message Header 62 in the shared switch and cache memory 58. Upon receiving the memory READ response 99 from the destination agent 55.2, the cache controller module 54 may update the TAG memory 90 to indicate that the requested data is stored in the shared switch and cache memory 58, where the TAG memory 90 now contains the pointer to the requested Message Header 62. The cache controller module 54 may then send a cache READ response 96 to the requesting agent 55.1, containing a pointer to appropriate entry in the Message Header 62 so that the requesting agent 55.1 may retrieve the requested data from the shared switch and cache memory 58.

In comparing FIG. 4 with FIG. 5, it will be noted that whether there is a cache hit or not, a pointer to the requested data is sent by the cache controller module 54 to the requesting agent 55.2. Thus, in an example embodiment, the process of whether there is a cache hit or not is hidden from the requesting agent 55.2. The cache controller module 54 may be realized as a set associative cache, and may be one, two, or a multiple-way set associative cache. The cache controller module 54 may maintain a free list to point to available memory locations in the Message Header 62, where the free list may be a partition of the shared switch and cache memory 58.

Example Computer System

Figure 6:
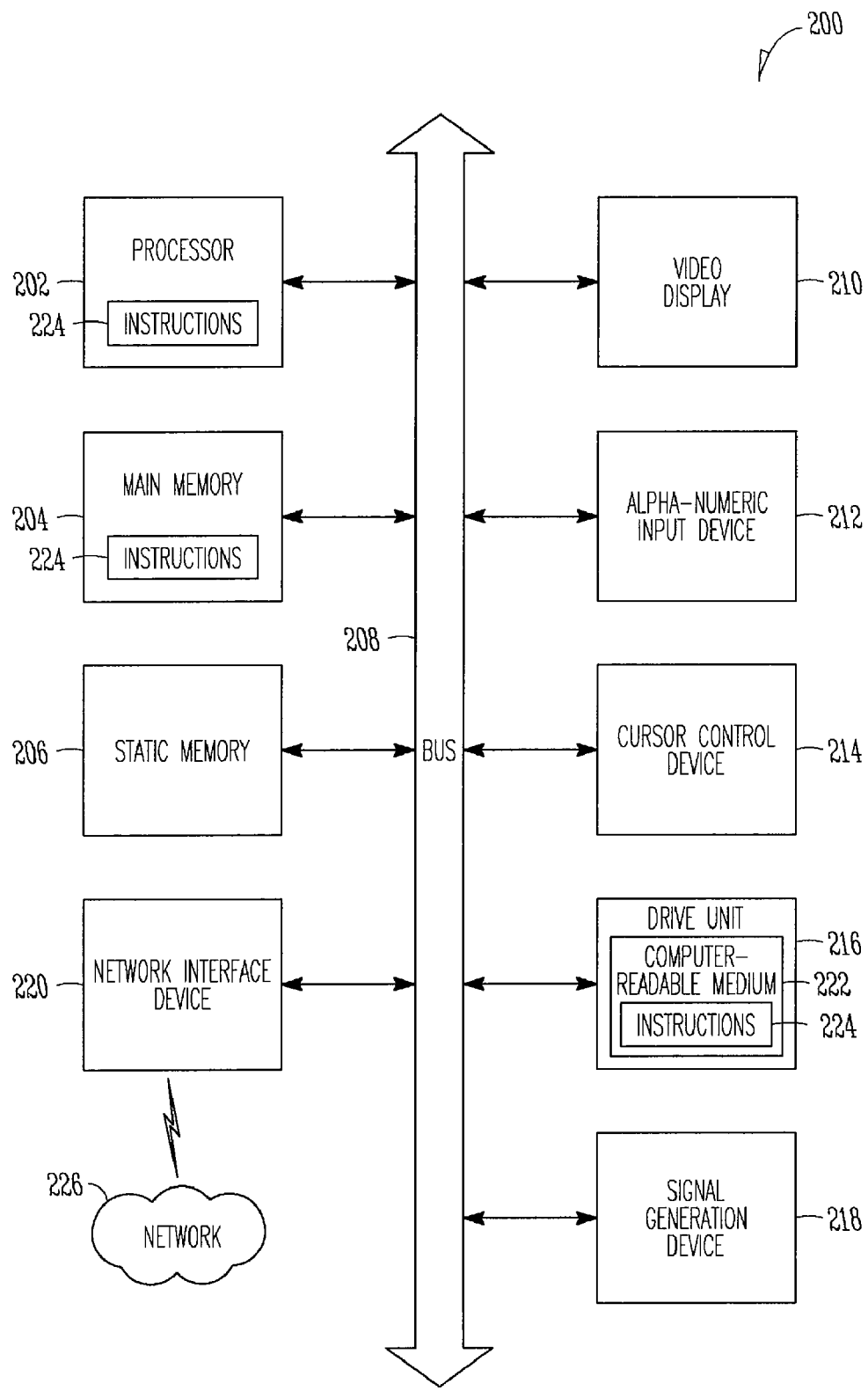
FIG. 6 shows a diagrammatic representation of machine in the example form of a computer system within which a set of instructions, for causing the machine to perform any one or more of the methodologies discussed herein, may be executed.

FIG. 6 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus comprising:
a message switch module to pass message headers, the message switch module further to receive a memory read request from a requesting agent coupled to the message switch module, identify if there is a pointer in the pointer memory corresponding to an address associated with the memory read request, and based on a determination there is a corresponding pointer, send a memory read response to the requesting agent;
a cache controller module coupled to and associated with the message switch module;
an arbitration logic module coupled to and associated with the message switch module and the cache controller module; and
a single integrated shared switch memory and cache memory integrated with the message switch module to provide shared memory to both the message switch module and to the cache controller module, the single integrated shared switch memory and cache memory being accessible to the cache controller module through the arbitration logic module, the single integrated shared switch memory and cache memory configured to send requested data to the requesting agent without requiring the cache controller module to write the requested data to the message switch module, the cache controller module further comprising the pointer memory to store a plurality of pointers, at least one of the plurality of pointers being configured to point to a location in the shared switch memory and cache memory.

2. The apparatus of claim 1, wherein at least one of the plurality of pointers is to point to a message header partition in the shared switch and cache memory.

3. The apparatus of claim 1, wherein, based on a determination there is no corresponding pointer, the apparatus is further configured to:
send a memory read request to a corresponding destination agent;
receive requested data from the destination agent;
store the requested data in the shared switch and cache memory;
add a pointer to the stored data in the pointer memory; and
send a memory read response to the requesting agent.

4. The apparatus of claim 3, wherein the destination agent, in response to receiving the memory read request, writes the requested data into the shared switch and cache memory.

5. The apparatus of claim 4, wherein the cache controller module sends, to the requesting agent, a pointer to the requested data in a message header partition of the shared switch and cache memory.

6. The apparatus of claim 1, wherein the shared switch and cache memory is partitioned into a message header partition and a message payload partition, and wherein an entry in the message header partition corresponds to a long message comprising a pointer to a corresponding entry in the message payload partition.

7. The apparatus of claim 6, wherein an entry in the message header partition corresponding to a short message does not comprise a pointer to the message payload partition.

8. The apparatus of claim 1, wherein the single integrated shared switch memory and cache memory includes a plurality of partitions including a message header queue and a message payload, the message header queue being configured to include information related to a destination agent, a source agent, and an operation code.

9. A method of processing memory requests in a network apparatus comprising a cache controller module, an arbitration logic module, and an associated message switch module, the method comprising:

receiving a message request to obtain requested data and a memory read request from a requesting agent;

identifying if there is a pointer in a pointer memory corresponding to an address associated with the memory read request, and based on a determination there is a corresponding pointer, sending a memory read response to the requesting agent;

accessing a single integrated shared switch memory and cache memory integrated within the message switch module, accessing the shared switch memory being based on a pointer in the cache control module to point to an address location in the shared switch memory and cache memory, the shared switch memory being accessible to the cache control module through the arbitration logic module;

sending the requested data from the shared switch memory and cache memory to the requesting agent without requiring the cache controller module to write the requested data to the message switch module; and providing the address location to the requesting agent.

10. The method of claim 9, wherein the pointer points to a message header partition in the shared switch and cache memory.

11. The method of claim 9, wherein, based on a determination there is no corresponding pointer, the method further comprises:

sending a memory read request to a corresponding destination agent;

receiving requested data from the destination agent;

storing the requested data in the shared switch and cache memory;

adding a pointer to the stored data in the pointer memory; and sending a memory read response to the requesting agent.

12. The method of claim 11, wherein the destination agent in response to receiving the memory read requests writes the requested data into the shared switch and cache memory.

13. The method of claim 12, wherein the cache controller module sends, to the requesting agent, a pointer to a message header partition of the shared switch and cache memory.

14. The method of claim 9, wherein the shared switch and cache memory is partitioned into a message header partition and a message payload partition, and wherein an entry in the message header partition corresponds to a long message comprising a pointer to a corresponding entry in the message payload partition.

15. The method of claim 14, wherein an entry in the message header partition corresponding to a short message does not comprise a pointer to the message payload partition.

16. The method of claim 9, further comprising:

comparing an address included with the message request with address entries stored in the cache controller module; and if the address matches an entry in the cache controller module, sending through the message switch module a memory read response to identify a memory location in the shared switch and cache memory corresponding to the requested data.

17. The method of claim 16, further comprising:

sending a memory read request to a destination agent if the address does not match any entry stored in the cache controller module, the memory read request requesting the destination agent to write the requested data into the shared switch and cache memory; and updating a corresponding pointer in the cache controller module.

18. The method of claim 9, further comprising partitioning the single integrated shared switch memory and cache memory to include a message header queue and a message payload, the message header queue being configured to include information related to a destination agent, a source agent, and an operation code.

19. A machine-readable storage medium comprising instructions which, when executed by a processor cause the machine to perform a method comprising:

receiving a message request to obtain requested data and a memory read request from a requesting agent;

identifying if there is a pointer in a pointer memory corresponding to an address associated with the memory read request, and based on a determination there is a corresponding pointer, sending a memory read response to the requesting agent;

accessing a single integrated shared switch memory and cache memory, the single integrated shared switch memory and cache memory being integrated within a message switch module, accessing the single integrated shared switch memory being based on a pointer in a cache control module to point to an address location in the single integrated shared switch memory and cache memory, the single integrated shared switch memory being accessible to the cache control module through an arbitration logic module;

sending the requested data from the shared switch memory and cache memory to the to the requesting agent without requiring the cache controller module to write the requested data prior to forwarding to the requesting agent; and providing the address location to the requesting agent.

20. The method of claim 19, further comprising partitioning the single integrated shared switch memory and cache memory to include a message header queue and a message payload, the message header queue being configured to include information related to a destination agent, a source agent, and an operation code.

* * * * *

UNITED STATES PATENT AND TRADEMARK OFFICE
CERTIFICATE OF CORRECTION

| | | |
|---|---|---|
| PATENT NO. | : 7,870,306 B2 | Page 1 of 1 |
| APPLICATION NO. | : 11/469447 | |
| DATED | : January 11, 2011 | |
| INVENTOR(S) | : Keith I. Wilkinson | |

It is certified that error appears in the above-identified patent and that said Letters Patent is hereby corrected as shown below:

In column 14, line 45, in Claim 19, after "to the" delete "to the".

Signed and Sealed this
Fifteenth Day of March, 2011

David J. Kappos
*Director of the United States Patent and Trademark Office*